Patented Apr. 16, 1940

2,197,269

UNITED STATES PATENT OFFICE 2,197,269

ANTIOXIDANT FOR FATS AND OILS

Arthur Guillaudeu, Chicago, Ill., assignor to Industrial Patents Corporation, Chicago, Ill., a corporation of Delaware No Drawing. Application December 19, 1938, Serial No. 246,674

20 Claims. (Cl. 99—163)

This invention relates to a method of treating fats and oils.

One of the objects of this invention is to provide a method for stabilizing edible fats and oils against rancidity.

Another object of this invention is to provide an improved shortening product which is stabilized against rancidity. Other objects and advantages will become apparent from the following detailed description.

The present invention is based upon the discovery that the tendency of fats and oils to become rancid may be retarded by treatment with reaction products of castor oil and an aliphatic acid having at least two reactive groups, such as two or more carboxyl groups, one or more carboxyl groups plus one or more hydroxyl groups, or one or more carboxyl groups plus one or more unsaturated bonds, or one or more carboxyl groups plus one or more hydroxyl groups plus one or more unsaturated bonds.

This invention permits the stabilization of fats and oils against rancidity without in any way affecting the characteristic flavor of the materials. It has been proposed to employ various organic acids such as citric and tartaric acids, and lower alkyl esters of organic acids, such as diethyl tartrate, in the stabilization of edible fats and oils. I have found that small amounts of reaction products of the type described may be used to effectively stabilize fats and oils against rancidity.

Castor oil is a naturally occurring glyceride, approximately eighty-five per cent of the fatty acid constituent consisting of ricinoleic acid. Ricinoleic acid differs from most of the other fatty acids contained in glycerides in that it contains a double bond and a hydroxyl group. A large proportion of castor oil consists of glycerine triricinoleate whose composition may be expressed by the following formula:

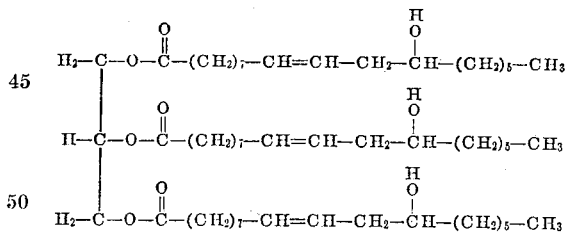

The balance of the glycerides in castor oil consist of glycerides having one or two ricinoleic acid radicals replaced by other fatty acid radicals. By careful hydrogenation of castor oil, the double bond may be saturated without destruction of the hydroxyl group. For the purposes of my invention, I may employ the reaction product of raw castor oil or of hydrogenated castor oil. The term "castor oil" is used herein and in the claims as a generic term to include both raw and hydrogenated castor oil.

The reaction product which is used as a stabilizing agent is prepared by reacting an aliphatic acid of the type described with castor oil. The reaction product may consist of an ester formed by esterification of one, two or all three hydroxyl groups of the ricinoleic acid radicals with the aliphatic acid, or it may consist of a mixture of two of the esters or all three of the esters, or it may consist of a complex compound formed by a reaction at the unsaturated bond and the hydroxyl group, in the case of raw castor oil. Examples of acids which may be used in the reaction are succinic, glutaric, adipic, maleic, fumaric, tricarballylic, glycollic, lactic, tartaric, malic, citric, aconitic, citraconic and itaconic acids, or anhydrides of such of these acids as form anhydrides, for example maleic, lactic, and succinic anhydrides. The term "aliphatic acids" is employed herein to include the acids and the anhydrides of such acids as form anhydrides.

The reaction product is formed by mixing castor oil with an aliphatic acid having at least two reactive groups or an anhydride of such an acid and heating the mixture at a temperature slightly above the melting point of the acid or acid anhydride. The reaction may be carried out at atmospheric pressure.

In the preparation of a reaction product of citric acid and castor oil, 10 grams of hydrogenated or hardened castor oil were mixed with 4.87 grams of citric acid, a small amount of hydrochloric acid being added to serve as a catalyst. The mixture was then heated in an oil bath to a temperature of about 175 degrees C. and maintained at this temperature for a period of about one hour, after which the mixture was allowed to cool for several days. The mixture was then reheated with frequent agitation. The product consisted of two distinct layers, the upper oily layer containing the reaction products of the hydrogenated castor oil and citric acid.

The stabilizing effect of the reaction product of citric acid and castor oil was determined by adding 0.1 per cent of the reaction product to hydrogenated cotton seed oil and subjecting the mixture to an active oxygen test at 208 degrees F. to obtain rapidly a measure of the stability of the resulting product. The shortening containing this reaction product withstood the active oxygen test for fifty-three hours as compared to an active oxygen test of thirty-five hours for samples of the hydrogenated cotton seed oil containing no stabilizing agent.

A reaction product of raw castor oil and citric acid was prepared by heating a mixture of 10 grams of raw castor oil and 5.63 grams of citric acid. This mixture was heated in an oil bath to a temperature of about 150 degrees C. and allowed to cool overnight. The mixture was then heated for eight hours, the temperature rising to about 175 degrees C. The upper oily layer which was formed was removed and employed as a stabilizing agent. Shortening comprising hydrogenated cotton seed oil to which had been added 0.1 per cent of this reaction product withstood the active oxygen test for fifty-one hours as compared to thirty-five hours for hydrogenated cotton seed oil containing no stabilizing agent.

Hydrogenated cotton seed oil containing 0.1 per cent of the reaction product of castor oil and tartaric acid withstood the active oxygen test for forty-six hours.

Hydrogenated cotton seed oil samples containing 0.1 per cent of the reaction product of castor oil and maleic anhydride withstood the active oxygen test for thirty-nine and thirty-eight hours.

Effective stabilization of fats and oils may be secured by the addition of from 0.01 per cent to 1.0 per cent of the reaction product. It will be understood, of course, that some stabilization is secured by adding to the fat or oil smaller amounts, and that the stabilizing effect is progressive. In most cases, the upper limit of the amount of the reaction product used is determined by the solubility of the product in the shortening. The addition of greater amounts of the product, however, produces little increase in the stabilizing effect.

Although the examples illustrate the stabilizing properties of the reaction products with respect to hydrogenated cotton seed oil, the reaction products may be employed to stabilize other oleaginous materials consisting of vegetable and animal fats and oils such as lard, beef fat, kapoc oil, palm oil, soya bean oil and the like, against rancidity. The term "shortening" is used in this specification and in the claims to include edible vegetable and animal fats and oils. It is to be understood that the reaction products may be used to stabilize oleaginous materials which are used for other than edible purposes, for example, fats and oils used for cosmetic purposes.

I claim:

1. The method of stabilizing oleaginous materials which comprises adding thereto and incorporating therewith a quantity of reaction products of castor oil and an aliphatic acid having at least two reactive groups.

2. The method of stabilizing oleaginous materials which comprises adding thereto and incorporating therewith a small amount of reaction products of castor oil and an aliphatic acid having at least two reactive groups.

3. The method of stabilizing shortening which comprises adding thereto and incorporating therewith a small amount of reaction products of hydrogenated castor oil and an aliphatic acid having at least two reactive groups.

4. The method of stabilizing shortening which comprises adding thereto and incorporating therewith from 0.01 per cent to 1.0 per cent of reaction products of castor oil and an aliphatic acid having at least two reactive groups.

5. The method of stabilizing shortening which comprises adding thereto and incorporating therewith 0.1 per cent of reaction products of castor oil and an aliphatic acid having at least two reactive groups.

6. The method of stabilizing shortening which comprises adding thereto and incorporating therewith 0.1 per cent of reaction products of castor oil and citric acid.

7. The method of stabilizing shortening which comprises adding thereto and incorporating therewith 0.1 per cent of reaction products of castor oil and tartaric acid.

8. The method of stabilizing shortening which comprises adding thereto and incorporating therewith 0.1 per cent of reaction products of castor oil and maleic anhydride.

9. As an article of commerce, an oleaginous product stabilized against rancidity consisting of a large proportion of oleaginous material and a complement of reaction products of castor oil and an aliphatic acid having at least two reactive groups.

10. As an article of commerce, shortening stabilized against rancidity containing from 0.01 per cent to 1.0 per cent of reaction products of castor oil and an aliphatic acid having at least two reactive groups.

11. As an article of commerce, shortening stabilized against rancidity containing 0.1 per cent of reaction products of castor oil and an aliphatic acid having at least two reactive groups.

12. As an article of commerce, shortening stabilized against rancidity containing 0.1 per cent of reaction products of castor oil and citric acid.

13. As an article of commerce, shortening stabilized against rancidity containing 0.1 per cent of reaction products of castor oil and tartaric acid.

14. As an article of commerce, shortening stabilized against rancidity, containing 0.1 per cent of reaction products of castor oil and maleic anhydride.

15. The method of stabilizing shortening which comprises adding thereto and incorporating therewith from 0.01 per cent to 1.0 per cent of reaction products of castor oil and citric acid.

16. The method of stabilizing shortening which comprises adding thereto and incorporating therewith from 0.01 per cent to 1.0 per cent of reaction products of castor oil and tartaric acid.

17. The method of stabilizing shortening which comprises adding thereto and incorporating therewith from 0.01 per cent to 1.0 per cent of reaction products of castor oil and maleic anhydride.

18. As an article of commerce, shortening stabilized against rancidity, containing from 0.01 per cent to 1.0 per cent of reaction products of castor oil and citric acid.

19. As an article of commerce, shortening stabalized against rancidity, containing from 0.01 per cent to 1.0 per cent of reaction products of castor oil and tartaric acid.

20. As an article of commerce, shortening stabilized against rancidity, containing from 0.01 per cent to 1.0 per cent of reaction products of castor oil and maleic anhydride.

ARTHUR GUILLAUDEU.